United States Patent [19]

Roberts

[11] Patent Number: 5,037,879

[45] Date of Patent: Aug. 6, 1991

[54] POLYURETHANE COMPOSITION WITH REDUCED WATER TO PREPOLYMER MIX RATIO

[75] Inventor: Gary P. Roberts, Forest Lake, Minn.

[73] Assignee: Minnesota Mining and Manufacturing Company, St. Paul, Minn.

[21] Appl. No.: 504,954

[22] Filed: Apr. 5, 1990

[51] Int. Cl.$^5$ .............................................. C08G 18/83
[52] U.S. Cl. .................................... 524/590; 523/130; 523/131; 524/317; 524/361; 524/871; 524/873
[58] Field of Search ............... 524/317, 361, 590, 871, 524/873

[56] References Cited

U.S. PATENT DOCUMENTS

| | | | |
|---|---|---|---|
| 3,719,050 | 3/1973 | Asao et al. | 61/36 R |
| 3,985,688 | 10/1976 | Speech | 260/2.5 AP |
| 4,315,703 | 2/1982 | Gasper | 405/264 |
| 4,383,079 | 5/1983 | Gasper et al. | 524/767 |
| 4,749,592 | 6/1988 | Gasper et al. | 427/140 |

FOREIGN PATENT DOCUMENTS 1035521  8/1978  Canada .

Primary Examiner—Paul R. Michl
Assistant Examiner—Edward J. Cain
Attorney, Agent, or Firm—Gary L. Griswold; Walter N. Kirn; Dale A. Bjorkman

[57] ABSTRACT

A hydrophilic polyurethane prepolymer in a compatible, water-miscible solvent or solvent blend having a solids content of greater than about 10 and less than about 50 percent prepolymer in organic solvent that reacts with water at about a 1:1 ratio by volume to produce an excellent gel for use in sealing water containing structures and soil stabilization. In the cure process, the compositions of the present invention expand less than 50%, and preferably less than 30%.

7 Claims, 4 Drawing Sheets

POLYURETHANE COMPOSITION WITH REDUCED WATER TO PREPOLYMER MIX RATIO

FIELD OF THE INVENTION

This invention relates to polyurethane prepolymer compositions useful as grout for sealing water containing structures and as soil stabilization compositions.

BACKGROUND

Various polyurethane prepolymer compositions have long been used for soil consolidation and as grouts for sealing structures. U.S. Pat. No. 3,985,688 to Speech is directed to a foam polyurethane grout that is typically pumped into a sewer line by using a sewer packer device that is pulled through the sewer with cables. The sewer packer is stopped at each joint and inflated to form a seal on opposite sides of the joint. The grout is injected at the middle portion of the packer to seal the joint and, after cure of the grout, the packer is deflated and pulled to the next joint. Foam grouts are usually difficult to utilize in this type of packer, because the foam expands in volume more than about 100% during reaction of the prepolymer with water. This amount of expansion can cause the foam to back up excessively into the packer and trap it in the sewer line.

Other polyurethane prepolymer compositions, such as disclosed in U.S. Pat. No. 3,719,050 to Asao et. al, are gels and do not expand in volume more than about 50% during the reaction of the prepolymer with water. The Asao composition suffers from the disadvantage that in order to provide a good gel as desired, the prepolymer is reacted with water at an eight or nine parts water to one part prepolymer ratio. This ratio of reactants necessitates the use of specialized pumping equipment to apply this particular grout product.

An alternative composition employed as a sewer sealing composition is based on acrylamide, which is used typically provided as a liquid pumped in a 1:1 ratio with water into the site of the leak and into the surrounding soil to form a cured gel which inhibits or prevents leaking. Much of the sewer sealing equipment employed in the United States and other countries has been designed to utilize acrylamide or acrylate type sealing compositions, that are pumped in a 1:1 ratio with water for cure.

SUMMARY OF THE PRESENT INVENTION

It has surprisingly been discovered that a comparatively low solids solution of a hydrophilic polyurethane prepolymer in a compatible, water-miscible oganic solvent or solvent blend will, when reacted with water at about a 1:1 ratio by volume, produces an excellent gel for use in sealing water containing structures and for soil stabilization. The compositions comprise a water-miscible organic solvent or solvent blend, and a water-soluble polyurethane polymer having terminal isocyanate groups. The polyurethane prepolymer is formed by reacting (1) a polyether compound having at least two terminal active hydrogen groups and a number average molecular weight between about 3,000 and 20,000 and having a random ethylene oxide units and higher alkylene oxide units in a mole ratio of ethylene oxide units to higher alkylene oxide units of at least about 1:1. The higher alkylene oxide units comprise three or more carbon atoms, and preferably are selected from the group consisting of propylene oxide, butylene oxide, pentylene oxide, hexylene oxide, and mixtures thereof. The polyol is reacted with (2) sufficient organic polyisocyanate compound having at least two terminal isocyanate groups to provide a NCO:OH ratio of about 5:1 to about 1.05 to 1.0. The composition of the present invention has a solids content of greater than about 10 and less than about 50 percent prepolymer in organic solvent.

In the cure process, the compositions of the present invention will expand less than 50%, and preferably less than 30%. A small amount of expansion, however, is desirable because it will provide a mechanical adhesion of the grout to the joint to be sealed.

DRAWING

Examples of known equipment suitable for practicing the method of this invention employing the composition of the present invention for sealing a joint in a concrete sewer line are illustrated in the accompanying drawings in which.

Figure 1:
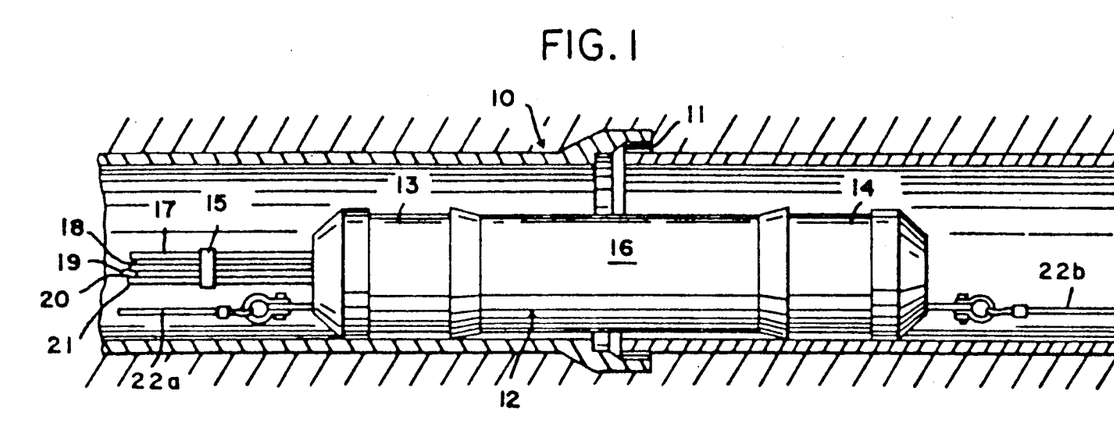
FIG. 1 is a view in elevation of a three element packer disposed in a sewer line (shown in cross-section) in the vicinity of a joint in the line.

Referring to the accompanying drawing and initially to FIG. 1, reference number 10 denotes generally a sewer line having joint 11 through which the incursion of water into the sewer line is occurring or may occur. Disposed within the line 10 is packer 12 with three inflatable diaphragm sections 13, 14, 16 shown in FIG. 1 in their collapsed conditions, which can be inflated by means of air. The air used to inflate the packer diaphragm sections is delivered to the packer by means of hoses 17, 18, 19, each hose serving to inflate one of the packer diaphragm sections. The prepolymer mixture of this invention is delivered to the packer via hose 20 and the water or a latex contained in sufficient water required for reaction of the prepolymer via hose 21, all of the hoses being held together by band 15. Packer 12 can be positioned by means of cables 22a and 22b attached to the packer and to an external means for moving the packer, e.g., winches.

Figure 2:
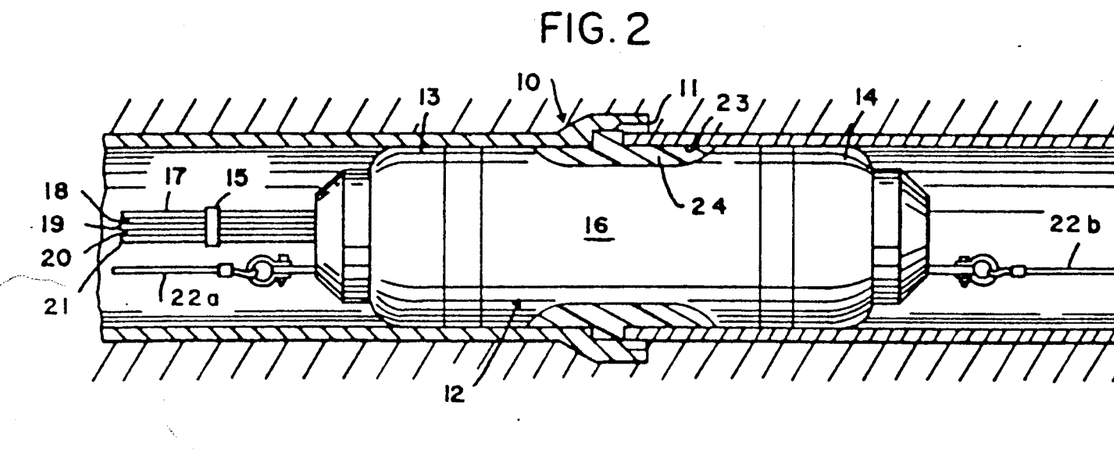
FIG. 2 is a view of the packer of FIG. 1 expanded at its ends to isolate the joint and form a circular cavity at the locus of the joint which is filled with a gelled mass.

In FIG. 2 the outer diaphragm sections 13, 14 of packer 12 have been inflated, isolating joint 11 and forming a circular or annular cavity 23 at the locus of the joint. The sealing composition of this invention is injected in a controlled amount into cavity 23 together with water, for example, by spraying separate streams of these materials into the cavity in such a manner as to cause the two sprays to impinge, thus ensuring rapid admixture and reaction.

Figure 3:
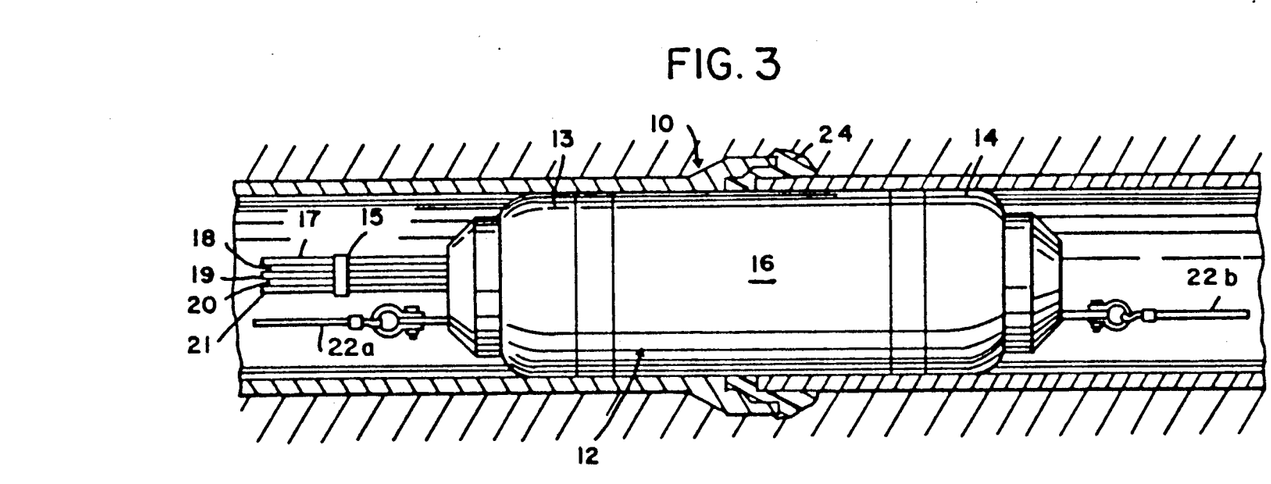
FIG. 3 is a view of the packer of FIG. 1 fully expanded to force the gelled mass from the cavity into the joint.

In a short time, e.g., 30 seconds after the injection, gel 24 begins to form in cavity 23 and center section 16 is inflated as shown in FIG. 3, forcing the still reacting gel into joint 11. After about 5-2000 seconds, gel 24 will have thickened to its maximum viscosity, forming gelled mass 24 which seals joint 11. Packer 12 can be deflated and moved by cables 22a and 22b to the next joint where the operation is repeated.

Figure 4:
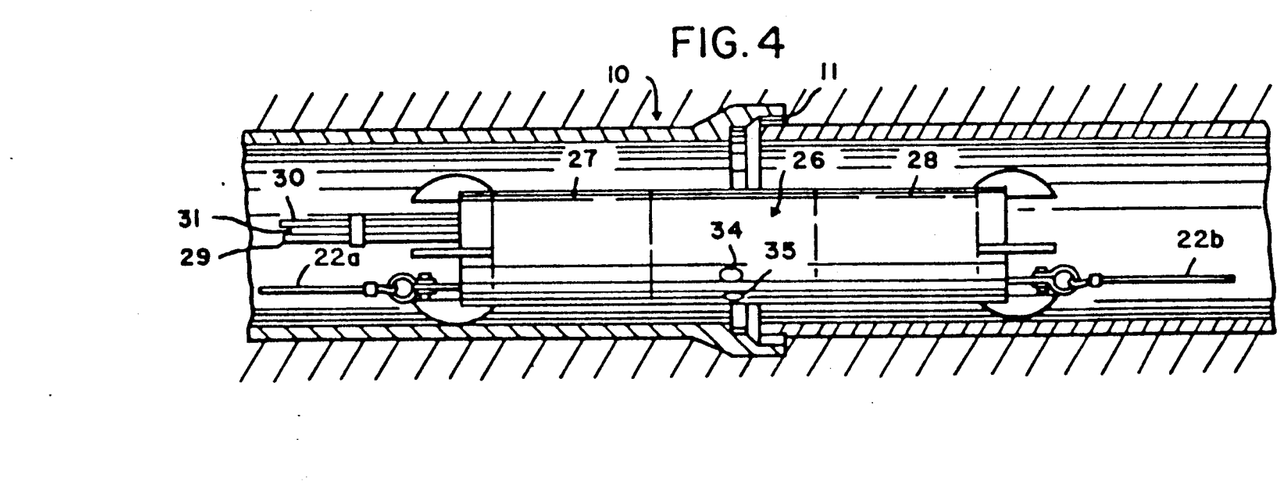
FIG. 4 is a view in elevation of a two element packer disposed in a sewer line (shown in cross-section) in the vicinity of a joint in the line.

Referring now to FIG. 4, sewer packer 26 is shown with two inflatable diaphragm sections 27 and 28 in their collapsed condition. Inflatable diaphragms 27 and 28 may be inflated by means of air delivered to packer 26 by means of air hose 31. The prepolymer mixture of this invention may be delivered by hose 30 and the water or latex and optional filler contained in sufficient water required for reaction of the prepolymer delivered via hose 29. Packer 26 may be positioned by means of cables 22a and 22b attached to the packer and to an external means for moving the packer, e.g., winches.

Figure 5:
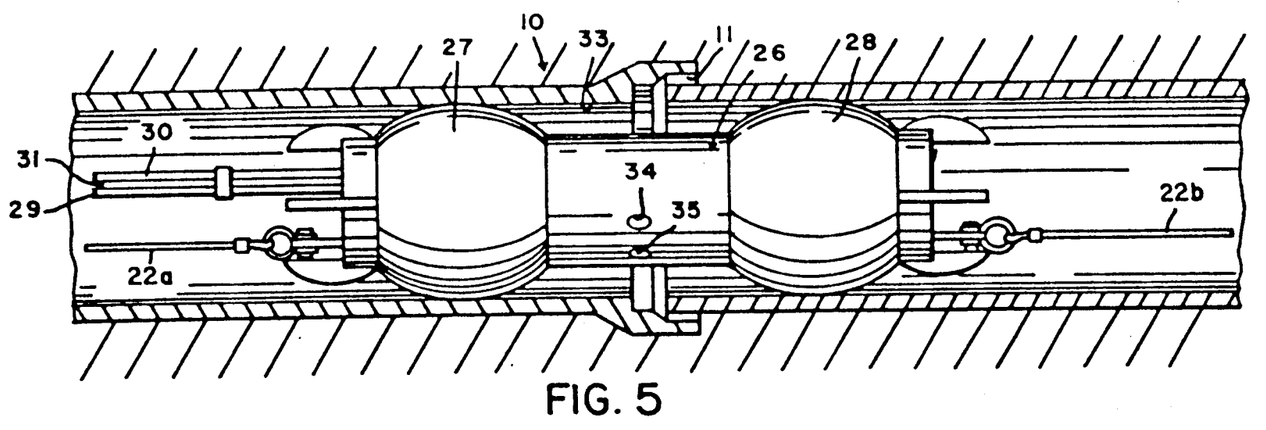
FIG. 5 is a view of the two element packer of FIG. 4 expanded at its ends to isolate the joint and form a circular cavity between the expanded packer surface and the inner sewer line surface.

In FIG. 5, inflatable elements 27 and 28 of packer 26 have been inflated isolating joint 11 and forming circular or annular cavity 33 at the locus of the joint between the packer wall and the inner wall of the sewer line. A controlled amount of the sealing composition of this invention may be injected into cavity 33 with the water or latex and optional filler material. These ingredients are introduced by pressure controlled flow through separate packer orifices 34 and 35, one orifice for the prepolymer and one for the water or latex and optional filler components. When the streams comingle, a reaction occurs, forming the gell-forming sealing composition.

Figure 6:
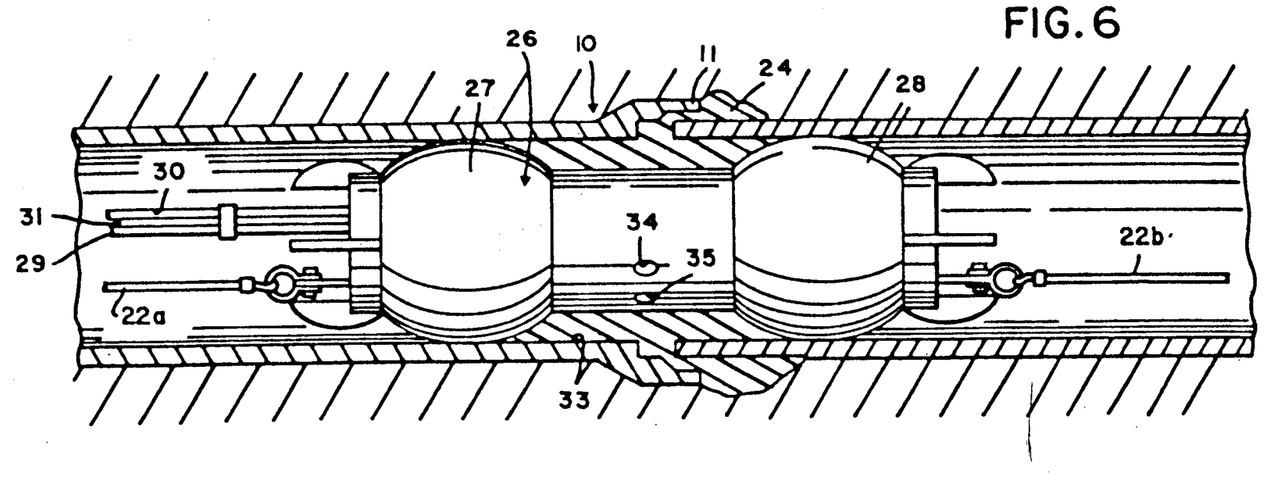
FIG. 6 is a view of the two element packer of FIG. 4 wherein a gelled mass has filled the cavity described in FIG. 5.

As shown in FIG. 6, gel 24 begins to form in cavity 33 and is forced into joint 11 and a minor amount of surrounding soil.

Figure 7:
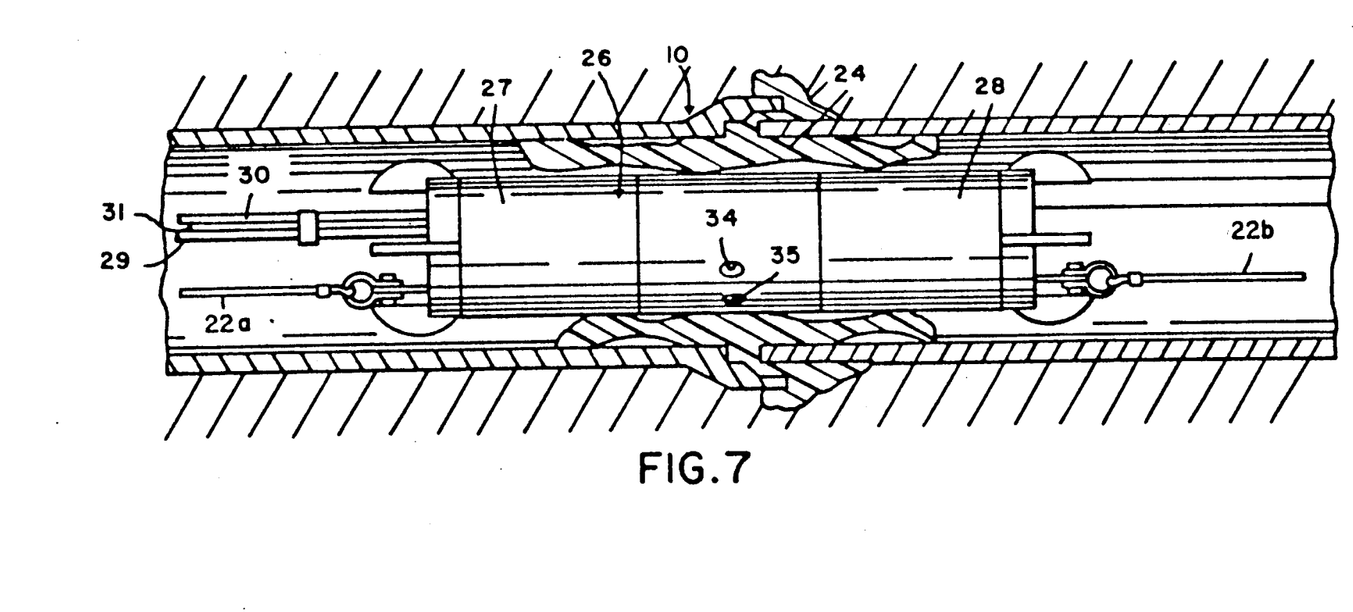
FIG. 7 is a view of the unexpanded packer of FIG. 4 after permitting the gelled material to flow into the joint area and into the surrounding soil.

FIG. 7 shows inflatable elements 27 and 28 deflated. After this deflation, packer 26 may be moved by means of cables 22a and 22b to the next joint and the operation repeated.

DESCRIPTION OF PRESENTLY PREFERRED EMBODIMENTS

The prepolymer composition of the present invention reacts with water at about a 1:1 ratio to form a gel, which is defined as a urethane hydrogel matrix that expands less than about 50%, and preferably less than about 30%, during gel formation. The amount of expansion is tested by forming the gel with known volumes of reactants in a beaker, allowing the gel to stand for at least 15 minutes after gelation, and then quickly measuring the volume of water displacement of the gel.

The solids content of the compositions of the present invention is greater than about 10 and less than about 50 percent of prepolymer in organic solvent. Compositions having a lower solids content than 10 percent tend to be too soft and lack tensile integrity for most sealing applications, and also have an undesirably long gel time. Low solids content also increases the risk of weakening of the grout by the presence of excessive running water at the application site. Compositions having a solids content of greater than about 50 percent result in foams, rather than gels, when mixed with water at the desired 1:1 ratio. Preferably, the solids content is between about 20 and 40 percent. This range of solids content provides strong gels that are more forgiving of slight variations in water reaction ratios that can occur on the job site.

A 1:1 water to prepolymer composition reaction ratio is employed in the application of the compositions of the present invention because most of the grouting equipment in the industry is capable of pumping only at that ratio. It will be understood that at least a 10% pumping variation in observed pumping ratios of this equipment is normal.

The compositions of the present invention also advantageously exhibit lower viscosity than polyurethane grout compositions that are presently available. This lower viscosity enhances the compatibility of the compositions with existing grout application equipment.

The preparation of isocyanate-terminated prepolymers, such as those used in the sealing composition of this invention, and the reaction thereof with water to form a polyurea, is disclosed in the art, e.g., U.S. Pat. Nos. 2,726,219, 2,948,691, 3,719,050, 3,985,688 and Canadian Pat. No. 1,035,521 and "Polyurethanes: Chemistry and Technology" by Saunders and Frisch, Part I, Interscience Pub., N.Y. (1962).

The urethane prepolymers used in this invention can be prepared by reacting an aliphatic or aromatic polyisocyanate with a polyether poly-active hydrogen compound using an NCO/active hydrogen equivalent ratio in the range of about 5:1 to about 1.05:1.

The terminal active hydrogen groups on the polyether poly-active hydrogen compound may be provided by polyols such as ethylene glycol, glycerine, trimethanolpropane, trimethanolethane, pentaerythritol, sorbitol, sucrose, and methylglucoside. The active hydrogens may also be provided by amines such as ethylenediamine, ethylenetriamine, and methylamine. An example of an amine terminated polyoxyalkalene compound are the Jeffamines ® commercially available from Texaco Chemical Co., Belair, Tex. Other active hydrogen containing compounds include castor oil, tall oil, carboxylic acids such as rosin, and compounds having at least two hydroxyl groups obtained by the reaction of aldehydes with other compounds (for example, olefins, aromatic hydrocarbons, and the like).

To insure water-miscibility, the polyether poly-active hydrogen compound will have a polymeric backbone that comprises at least about 50 percent ethylene oxide units. Generally the prepolymers will have a molecular weight range of about 3,000-20,000, preferably 5,000 to 10,000. Commercially available polyol precursors useful in making the above described water-soluble isocyanate-terminated prepolymers are the hydrophilic polyols, e.g., "Carbowax" (commercially available from Union Carbide, Danbury, Conn.). Blends of prepolymers, including various amounts of poly(oxyethylene-oxypropylene) polyols, or hydrophilic polyols with heteric oxyethylene-oxypropylene chains, are also envisioned.

In order to provide better crosslinking of the prepolymers in formation of the gel, the preferred prepolymers have greater than two isocyanate functionalities per molecule. Most preferably, the prepolymer comprises three polyether branches from a central triol moiety. Alternatively, crosslinking may be facilitated by using polyfunctional terminal moieties on the ends of the polyether backbone, or crosslinking agents such as trimethylol propane may be incorporated in the prepolymer composition. The use of polyisocyanates having on average more than two isocyanate functionalities will also provide a good gel matrix formation.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-isocyanate, and 20 weight percent of tolylene-2,6-isocyanate; a 65:35 blend of the 2,4- and 2,6-isomers is also useable. Other useable polyisocyanate compounds which can be used are other isomers of tolylene diisocyanate, hexamethylene-1,6-diisocyanate, diphenyl-methane-2,4'-diisocyanate diphenyl-methane-4,4'-diisocyanate, m- or p-phenylene diisocyanate and 1,5-naphthalene diisocyanate, or blends thereof. Polymeric polyisocyanates can also be used, such as polymethylene polyphenyl polyisocyanates. A list of useful commercially available polyisocyanates is found in *Encyclopedia of Chemical Technology* by Kirk and Othmer, 2nd. Ed., Vol. 12, pages 46, 47, Interscience Pub. (1967). Most preferably, the isocyanate has low volatility to reduce the concerns of harm to application personnel through inhalation.

The polyurethane prepolymers of the present invention are liquids or greasy or pasty solids at room temperature. They are reactive in the presence of water to form a cross-linked, water-insoluble, water-containing gelatinous mass having a high degree of elasticity. Reaction times to convert the prepolymer to the gel in the presence of water may be on the order of less than a minute to several hours.

The solvents that may be used to dissolve the prepolymers are water-miscible, polar organic solvents which are preferably volatile at the ambient conditions of the environment where the sealing composition is to be used and do not react with isocyanate. Useful water-miscible solvents include methyl acetate, tetrahydrofuran, dimethyl formamide, ethylene glycol monoethyl ether acetate (sold under the trade designation "Cellosolve" acetate by Union Carbide), Epsilon-Caprolactone (commercially available as TONE® Monomer EC from Union Carbide Corporation, Danbury, Conn.), N-methyl pyrrolidone, N-methyl morpholine, and ethylene glycol monomethyl ether acetate. The preferred solvents are acetone and diethylene glycol ethyl ether acetate. The gel time of these compositions can be varied by modifying the solvent or solvent blend to adjust the pH of the composition. Compositions prepared using more basic solvents tend to have shorter gel times.

Additional filler materials may be added to the sealing composition of the present invention to provide a more shrink-resistant, cured sealing composition with a higher compression strength. For this purpose, any of a number of filler compositions have been found to be particularly effective. Useful fillers include water-insoluble particulate filler material having a particle size of about less than 500 microns, preferably 1 to 50 microns and a specific gravity in the range of 0.1 to 4.0, preferably 1.0 to 3.0. The filler content of the cured sealing composition of the present invention may be as much as 60 parts filler per 100 parts by weight cured sealing composition, preferably 5 parts to 20 parts per 100.

A preferred method of reinforcing the polyurethane gel is to mix the prepolymer with an aqueous polymeric latex such as described in U.S. Pat. No. 4,315,703. In this embodiment, a filler is incorporated into the ultimate polyurethane gel through the water component of the gel.

Other additive ingredients may be included in the sealing composition of the present invention, or may be added to the water at the time of application of the gel. For example, fungicides may be added to prolong the life of the gel and to prevent attack by various fungi. Other active ingredients may be added for various purposes, such as substances to prevent encroachment of plant roots, and the like. Care should be exercised in choosing fillers and other additives to avoid any materials which will have a deleterious effect on the viscosity, reaction time, and the stability of the gel being prepared.

The addition of a base as a catalyst, e.g., tertiary amine catalyst, 2,4,6-tridimethyl aminomethylphenol, 1,4-diazabicyclo (2,2,2)-octane, triethylamine or other amines and metal compound catalysts known in the urethane art, reduces the cure time at ambient sewer temperatures (typical ambient sewer teperatures are about 10° C.). The tertiary amines are typically added to the water used as a coreactant, or may be added to the prepolymer composition. In either case, the tertiary amines ar ®usually present in amounts of about 0.1 to 1.0 parts by weight of prepolymer. The basic catalyst, used in small amounts, results in improved cure rates without detracting from the physical properties of cured foam.

The invention is further illustrated by the following nonlimiting examples:

Prepolymers A, B and C, useful in the preparation of the sealing compositions and the practice of the invention, are prepared as follows:

Prepolymer A

Benzoyl chloride (about 0.035% by weight of the ultimate 77% solids composition) was blended at room temperature under nitrogen with 1 equivalent of an approximately 5000 M. W. polyether triol ("Poly G 83-34," a copolymer of ethylene oxide and propylene oxide commercially available from Olin Corp.). Thereafter, 2.35 equivalents of an 80:20 mixture of 2,4-toluene diisocyanate: 2,6-toluene diisocyanate wa rapidly added to the resultant mixture with aggressive agitation. The mixture was maintained at 80°-85° C. until the reaction was determined to be complete by titration. The reaction mixture was then dissolved in sufficient diethylene glycol ethyl ether acetate ("Ektasolve DE Acetate," commercially available from Eastman Chemical Products, Inc., hereafter DE Acetate) to provide 77% solids.

Prepolymer B

A polymer was prepared using the same materials and conditions as in the preparation of Prepolymer A, above, except that reagent grade acetone was substituted for DE Acetate to yield 80% solids. A blue dye (0.05% by weight) was also added.

Prepolymer C

To one equivalent of an approximately 5000 M. W. polyether triol ("Poly G 83-34," a copolymer of ethylene oxide and propylene oxide commercially available from Olin Corp.) was added with aggressive agitation 2.5 equivalents of a polyisocyanate prepolymer based on diphenylmethane diisocyanate containing a high percentage of the 2,4' diphenylmethane diisocyanate isomer (Mondur XP-744, from Mobay Chemical Corporation). After addition was complete, a sufficient amount of DE Acetate was added to provide about a 95% solids composition. The mixture was then heated and maintained at 80°–85° C. for four hours. The reaction mixture was then further diluted to 30% solids with additional DE Acetate, and benzoyl chloride (about 0.013% by weight of the ultimate 30% solids composition) was added. The reaction was then determined to be complete by titration. The prepolymer viscosity was determined to be 140 cps.

EXAMPLE 1

To demonstrate the effect of a reduction in the solids (prepolymer) content of the grout in forming a gel as opposed to a foam, Prepolymer A was diluted with DE Acetate to various solids contents and cured by mixing at various volume ratios with distilled water at room temperature. Evaluation was as follows:

| Diluted Solids (%) | Prepolymer Viscosity (centipoise) | Mix Ratio (Water:Prepolymer) (parts:parts) | Gel Time (sec) | Gel Traits | Expansion (%) |
|---|---|---|---|---|---|
| 77 | 1140 | 8:1 | 45 | gel | 0–5 |
| 77 | 1140 | 5:1 | 66 | gel | 40–50 |
| 77 | 1140 | 1:1 | 60 | foam | 204 |
| 65 | 700 | 6:1 | 44 | gel | — |
| 60 | 350 | 5:1 | 42 | gel | — |
| 60 | 450 | 3:1 | 40 | foam | — |
| 60 | 350 | 1:1 | 65 | foam | 114 |
| 50 | 150 | 1:1 | 70 | foam | 57 |
| 40 | 105 | 1:1 | 86 | gel | 14 |
| 30 | 80 | 1:1 | 120 | gel | 3 |
| 25 | 64 | 1:1 | 179 | gel | 2 |
| 20 | 52 | 1:1 | 221 | gel | 2 |

The low viscosity of the 30% solids (or less) grouts enabled them to mix much more readily with water than the higher viscosity materials. This is an advantage when the grout is applied using commercially available packers in sewer rehabilitation applications.

EXAMPLE 2

To demonstrate the effect of additives on gel properties, the following additives were evaluated by addition to distilled water. The water:prepolymer volume ratio was 1:1. Prepolymer A was used in all cases, and diluted to the solids listed with DE Acetate. Percentages reported in the composition column are percentages by weight.

| Prepolymer Solids (%) | Aqueous Component Composition | Gel Time (sec) | Gel Traits |
|---|---|---|---|
| 30 | Distilled Water | 100 | gel |
| 30 | 50% Distilled Water 50% 5612 | 92 | gel |
| 30 | 80% Distilled Water 20% 5612 | 88 | gel |
| 30 | 80% Distilled Water 20% 5612 + 0.25% 5601 | 69 | gel |
| 25 | 50% Distilled Water 50% 5612 | 110 | gel |
| 20 | 50% Distilled Water 50% 5612 | 135 | gel |
| 30 | 85% Distilled Water 15% 5611 | 5 | gel |
| 30 | Distilled Water + 0.25% triethanolamine | 75 | gel |
| 30 | 50% Distilled Water 50% Witcobond W-160 | 41 | gel |
| 30 | Distilled Water + 2% 5611 + 0.1% Niax A-99 | 66 | gel |

Notes:
5612 = Scotch-Seal ™ Brand Gel Reinforcing Agent 5612, a carboxylated styrene-butadiene polymer emulsion in water, from 3M Company.
5601 = Scotch-Seal ™ Brand Accelerator 5601, 2-(dimethylamino)-ethanol, from 3M Company.
5611 = Scotch-Seal ™ Brand Gel Control Agent 5611, a solution of a polymeric amine in water, from 3M Company.
Witcobond W-160 = A commercial urethane dispersion in water from Witco Chemical Corp.
Niax A-99 = bis-2-dimethylaminoethylether, a commercial urethane catalyst from Union Carbide Corp.

EXAMPLE 3

To demonstrate the utility of blends of water-miscible solvents, Prepolymer B was diluted to 30% solids with acetone. The resultant composition mixed readily with distilled water at a 1:1 ratio and had a gel time of 41 seconds.

EXAMPLE 4

To demonstrate the utility of alternate water-miscible solvents, Prepolymer A was diluted to 30% solids with blends of DE Acetate and N-methylpyrrolidone ("M-Pyrol", available from GAF Corp.) and evaluated as a 1:1 gel with distilled water at room temperature.

| Solvent Composition | | | |
|---|---|---|---|
| % diethylene glycol ethyl ether acetate | % N-methyl-pyrrolidone | Viscosity | Gel Time (sec) |
| 100 | 0 | 82 | 96 |
| 0 | 100 | 75 | 18 |
| 50 | 50 | 75 | 39 |
| 75 | 25 | 80 | 60 |
| 80 | 20 | 77 | 65 |
| 90 | 10 | 81 | 80 |

All the above compositions mixed readily with water.

EXAMPLE 5

To demonstrate the utility of isocyanates based on diphenylmethane diisocyanate, Prepolymer C was evaluated as a chemical grout by curing it at a 1:1 ratio with distilled water. The prepolymer mixed readily with water. An acceptable gel was formed in 88 seconds.

I claim:
1. A method of sealing a water containing structure to prevent or minimize leakage which comprises mixing a sealing composition comprising a water-miscible organic solvent or solvent blend and a water-soluble, polyurethane prepolymer having terminal isocyanate groups formed by reacting
   (i) a polyether polyol having at least two terminal active hydrogen groups and a number average molecular weight between about 3,000 and 20,000 and having random ethylene oxide units and higher alkylene oxide units in a mole ratio of ethylene oxide units to higher alkylene oxide units of at least about 1:1, wherein said higher alkylene oxide units comprise three or more carbon atoms, and
   (ii) sufficient organic polyisocyanate compound having at least two terminal isocyanate groups to provide an NCO:OH ratio of about 5:1 to about 1.05:1; said composition having a solids content of greater than about 10 and less than about 50 percent prepolymer in organic solvent with water in the ratio of about 1:1 and injecting the mixture under pressure at the locus of the leakage.

2. The method of claim 1, wherein said higher alkylene oxide units in the polyether polyol are selected from a group consisting of propylene oxide, butylene oxide, pentylene oxide, hexylene oxide, and mixtures thereof.

3. The method of claim 1, wherein the water-miscible organic solvent is acetone.

4. The method of claim 1, wherein the water-miscible organic solvent is diethylene glycol ethyl ether acetate.

5. The method of claim 1, wherein the active hydrogen groups are hydroxyl groups.

6. The method of claim 1, wherein the active hydrogen groups are primary or secondary amine groups.

7. The method of claim 1, wherein the composition has a concentration of between about 20 to 40 percent prepolymer solids in the organic solvent.

* * * * *

UNITED STATES PATENT AND TRADEMARK OFFICE
CERTIFICATE OF CORRECTION

PATENT NO. : 5,037,879
DATED : August 6, 1991
INVENTOR(S) : Roberts

It is certified that error appears in the above-identified patent and that said Letters Patent is hereby corrected as shown below:

Column 2, line 2, "polyol" should be --compound--.

Column 6, line 24, "ar®" should be --are--.

Signed and Sealed this

Twenty-seventh Day of April, 1993

*Attest:*

MICHAEL K. KIRK

*Attesting Officer*     *Acting Commissioner of Patents and Trademarks*